(12) United States Patent
Zhao et al.

(10) Patent No.: US 10,830,215 B2
(45) Date of Patent: Nov. 10, 2020

(54) ANTI-ICING AND DEICING METHOD AND DEVICE FOR HIGH-POWER WIND TURBINE BLADES

(71) Applicant: ZHUZHOU TIMES NEW MATERIALS TECHNOLOGY CO., LTD., Hunan (CN)

(72) Inventors: Jiangang Zhao, Zhuzhou (CN); Wentao Yang, Zhuzhou (CN); Chaoyi Peng, Zhuzhou (CN); Jingcheng Zeng, Zhuzhou (CN); Binbin Hou, Zhuzhou (CN); Jiaotong Jin, Zhuzhou (CN); Xiao Li, Zhuzhou (CN)

(73) Assignee: ZHUZHOU TIMES NEW MATERIALS TECHNOLOGY CO., LTD., Hunan (CN)

( * ) Notice: Subject to any disclaimer, the term of this patent is extended or adjusted under 35 U.S.C. 154(b) by 389 days.

(21) Appl. No.: 15/509,704

(22) PCT Filed: Mar. 18, 2015

(86) PCT No.: PCT/CN2015/074500
§ 371 (c)(1),
(2) Date: Mar. 8, 2017

(87) PCT Pub. No.: WO2016/037476
PCT Pub. Date: Mar. 17, 2016

(65) Prior Publication Data
US 2017/0260969 A1    Sep. 14, 2017

(30) Foreign Application Priority Data

Sep. 12, 2014    (CN) .......................... 2014 1 0461139

(51) Int. Cl.
| | | |
|---|---|---|
| *F03D 80/40* | (2016.01) | |
| *F03D 1/06* | (2006.01) | |
| *F03D 7/04* | (2006.01) | |

(52) U.S. Cl.
CPC ........... *F03D 80/40* (2016.05); *F03D 1/0675* (2013.01); *F03D 7/042* (2013.01); *Y02B 10/30* (2013.01);
(Continued)

(58) Field of Classification Search
CPC ........ F03D 1/065; F03D 1/0675; F03D 7/042; F03D 17/00; F03D 80/40;
(Continued)

(56) References Cited

U.S. PATENT DOCUMENTS 8,029,239 B2 * 10/2011 Luetze .................... F03D 15/05
416/91
9,133,819 B2 * 9/2015 Zuteck .................... F03D 7/022
(Continued)

FOREIGN PATENT DOCUMENTS

| CN | 1727673 A | 2/2006 |
|---|---|---|
| CN | 102562479 A | 7/2012 |

(Continued)

OTHER PUBLICATIONS

International Search Report for PCT/CN2015/074500 dated May 12, 2015 [PCT/ISA/210].

*Primary Examiner* — David E Sosnowski
*Assistant Examiner* — Alexander A White
(74) *Attorney, Agent, or Firm* — Sughrue Mion, PLLC (57) ABSTRACT

A modular gas-heat anti-icing method as well as a device for high-power wind turbine blades, wherein a modular heating system is provided on the blade root, a ventilation duct is provided inside the blade, a wind deflector is provided at the end of the ventilation duct, which divides the front edge of (Continued)

the blade into two parts, so that the hot air in the ventilation duct is only to be conducted to the blade tip and then circulates into the blade root via the rear edge of the blade, enabling the hot air to circulate inside the blade and form a "blade root to blade tip to blade root" closed loop, so that the purpose of heating the front edge of the blade is achieved, and it is ensured that the whole blade does not ice by preventing the front edge of the blade from icing.

15 Claims, 4 Drawing Sheets

(52) U.S. Cl.
CPC ........... *Y02E 10/721* (2013.01); *Y02E 10/722* (2013.01); *Y02E 10/723* (2013.01); *Y02E 10/728* (2013.01)

(58) Field of Classification Search
CPC ............ B64D 2013/0607; B64D 15/00; B64D 15/20; B64D 15/22; B64D 2033/0233; F02C 7/047; F02C 7/055
See application file for complete search history.

(56) References Cited

U.S. PATENT DOCUMENTS

| | | | |
|---|---|---|---|
| 2011/0038729 | A1 | 2/2011 | Shymanski et al. |
| 2013/0106108 | A1* | 5/2013 | De Boer .................. F03D 7/045 290/44 |
| 2015/0050143 | A1* | 2/2015 | Kammer .................. F03D 17/00 416/1 |
| 2016/0003223 | A1* | 1/2016 | Barth ..................... F03D 1/0675 416/1 |
| 2016/0040654 | A1* | 2/2016 | Cuoghi .................. F03D 1/0675 416/1 |
| 2016/0047356 | A1* | 2/2016 | Pawis ...................... F03D 80/40 416/96 R |

FOREIGN PATENT DOCUMENTS

| | | |
|---|---|---|
| CN | 103184984 A | 7/2013 |
| DE | 196 21 485 A1 | 3/1998 |
| WO | WO-2014135248 A1 * | 9/2014 ............ F03D 80/40 |

* cited by examiner

ANTI-ICING AND DEICING METHOD AND DEVICE FOR HIGH-POWER WIND TURBINE BLADES

TECHNICAL FIELD

The current invention relates to a handling method and device for wind turbine blades, especially an Anti-icing method and device for high-power wind turbine blades, and belongs to the technical field of anti-icing wind turbine blades.

TECHNICAL BACKGROUND

In order to solve the environmental problems caused by fossil fuel, environmental friendly new energy has been developed to replace fossil fuel. Wind power is one of the most popular energy, which has been used mainly to generate electricity. During the operation of the wind power generating assembly, the blades experience all kinds of severe environment, especially in wet and cold highlands, the blades can easily ice. After icing, the generation power is reduced and the generating assembly even stops. The unbalanced weight of the blades can lead to the fatigue damage at the bottom of the tower, and the ice blocks falling from the rotating blades can cause accidents. As a result, it is a popular theme in the wind power research to prevent blade icing or to quickly remove the ice of the blades. It is worth mentioning that in addition to the vast area in the country where the newly installed power generation units need anti-icing for the blades, other plateau areas, such as Yungui areas, where traditional wind machines are used, also need anti-icing improvements.

Currently, there are certain anti-icing techniques have been protected by patents. The Chinese patent application, CN101821500A, discloses a method for de-icing a blade of a wind turbine after the wind turbine has been idle for a period of time. However, this method can only remove ice when the turbine is still, and cannot prevent the blade from icing. The U.S. Pat. No. 6,676,122B1, conducts the hot air of the electric generator through the pipeline into the blades to heat the blades and to achieve the regeneration of the electric generator at the same time. However, it did not disclose the exact pipeline of the hot air stream. The Chinese patent application, CN102748243A, installs a heating type blower at the root of the blade, and uses thermally insulated pipes to conduct hot air into the front edge of the blade. It also discloses the design of the pipes, however it does not disclose any control of the heating of the blades or the distribution of the temperature sensors. The German company, Enercon, has application examples for preventing/removing ice using heated air. However, the structure of the examples is complicated and needs further improvement, even though it shows that it is reliable to use heated air to heat the blades and to prevent and remove ice from the blade surface.

The following is related state of the art:
1. Device and method for preventing rotor blade of wind driven generator from freezing, application number: 201110131800.3.
2. Method for de-icing blade of wind turbine, wind turbine and use thereof, application number: 200880110464.0. The invention relates to a method for de-icing a blade of a wind turbine, after the wind turbine has been idle for a period of time. The method comprises the steps of creating a controlled acceleration condition of the blade, and subsequently creating a controlled deceleration condition of the blade, whereby ice is shaken of the blade.
3. Wind turbine blades having anti-icing and de-icing capability, application number: 201210244203.6. Technical solution: installing a heating type blower at the root of the blade, and using thermally insulated pipes to conduct hot air into the front edge of the blade.
4. Deicing method for blades of large-scale wind driven generator, application number: 201010581255.3.
5. Anti-congelation and anti-icing electric control device of wind driven generator blade, application number: 201310013318.9.
6. A heated air anti-icing device for wind driven generator blade, application number: 201310512948.0.
7. Manufacturing method of icing-protection wind power generator blade, application number: 201110283973.7.
8. Blade of wind-driven generator blade, wind-driven generator and deicing system thereof, application number: 201310404500.7.

The above patent applications all relate to anti-icing, ice-removal method and device for wind power blades. However, they are all passive anti-icing method. That is to say, they are all related with anti-icing method when ice is already formed, but not preventing icing beforehand. The effects of these methods are not ideal and do not provide solution of how to prevent icing, and therefore need further improvements.

CONTENT OF THE INVENTION

The technical problem to be solved by the present invention is: providing a modular gas-heat anti-icing method as well as a device for high-power wind turbine blades which mainly heats the front edge of the blades. The current invention provides a modular gas-heat anti-icing method and system for high-power wind turbine blades, which can be used in idle wind wheels. This fills a gap in the state of the art.

The current invention is related with a modular gas-heat anti-icing method for high-power wind turbine blades, wherein a modular heating system is provided on the blade root, a ventilation duct is provided inside the blade, a wind deflector is provided at the end of the ventilation duct, which divides the front edge of the blade into two parts, so that the hot air in the ventilation duct is only to be conducted to the blade tip and then circulates into the blade root via the back edge of the blade, enabling the hot air to circulate inside the blade and form a "blade root to blade tip to blade root" closed loop, so that the purpose of heating the front edge of the blade is achieved, and it is ensured that the whole blade does not ice by preventing the front edge of the blade from icing.

Further, the ventilation duct is disposed within the interior space of the front edge of the blade and extends from the blade root 10 to 20 m toward the blade tip, and ensures to extend to the farthest part of the blade tip, so that the hot air in the ventilation duct is only to be conducted to the blade tip and then circulates into the blade root via the back edge of the blade, enabling the hot air to circulate inside the blade and form a "blade root to blade tip to blade root" closed loop.

Further, the modular heating system comprises a detachable heating system and the ventilation duct connected with the heating system, wherein the heating system is provided at the blade root, and the heating system comprises a blower module, a heating module, a power supply control module and a wireless control module, wherein the heating module is connected with the blower module, the heating system is located at the blade root, the power supply control module and the wireless control module are disposed at the side of the heating module, and the ventilation duct is installed on the anti-shearing web plate.

Further, four temperature control points are located inside the blade, wherein each temperature control point is provided with a temperature sensor, and the four temperature control points are: air outlet of the heater, the outlet of the ventilation duct, the surface of the interior space of the front edge of the blade which is 15-20 m distant from the blade root, the surface of the interior space of the back edge of the blade which is 5 m distant from the blade root, wherein the four temperature sensors detect the interior temperature of the blade and the four temperature control points all participate in the system control logic.

Further, the system control logic is: when the temperature of the surface of the interior space of the front edge of the blade 15-20 m distant from the blade root is higher than the set temperature, the heating system stops working, and when the temperature of the four temperature control points are all lower than the set temperature, the heating system starts heating.

Further, a human-computer interface in installed in the tower, wherein the human-computer interface is connected with the four temperature sensors of the four temperature control points, and receive four temperature signals from the temperature sensors, and the human-computer interface includes a wireless receiving device, a display device and a PLC controller that are cooperative with the wireless box, wherein the wireless receiving device, the display device, the temperature sensor, the electrical cabinet, the heater are all connected with the PLC controller, and wherein the display device displays the operation data of the heating system and whether breakdown occurs, and the PLC controller controls the operation of the modular gas-heat anti-icing system for high-power wind turbine blades.

Further, the current data of the heating system as well as the temperature data and the control signals collected by the temperature sensor establish signal communication with the human-computer interface in the tower through wireless signals emitted by the wireless box, and the human-computer interface is provided with a operation control system which controls the modular gas-heat anti-icing system for high-power wind turbine blades, and the human-computer interface is input with control parameters in order to realize the automatic operation of the modular gas-heat anti-icing system for high-power wind turbine blades.

A wind turbine blade anti-icing device for carrying out the above modular gas-heat anti-icing method for high-power wind turbine blades, comprising wind turbine blades, anti-shearing web plates in the blades, a dismountable heating system, a ventilation duct that is connected with the heating system, and the wind turbine blades are installed on the tower, characterized in that the heating system comprises a blower module, a heating module which is connected with the blower module, a power supply control module and a wireless control module, wherein the heating system is located at the blade root and is a modular heating system, a ventilation duct is provided inside the blade, a wind deflector is provided at the end of the ventilation duct, which divides the front edge of the blade into two parts, so that the hot air in the ventilation duct is only to be conducted to the blade tip and then circulates into the blade root via the back edge of the blade, enabling the hot air to circulate inside the blade and form a "blade root to blade tip to blade root" closed loop, so that the purpose of heating the front edge of the blade is achieved, and it is ensured that the whole blade does not ice by preventing the front edge of the blade from icing.

Further, the ventilation duct is disposed within the interior space of the front edge of the blade and extends from the blade root 10 to 20 m toward the blade tip, and ensures to extend to the farthest part of the blade tip, so that the hot air in the ventilation duct is only to be conducted to the blade tip and then circulates into the blade root via the back edge of the blade, enabling the hot air to circulate inside the blade and form a "blade root to blade tip to blade root" closed loop.

Further, the modular heating system comprises a detachable heating system and the ventilation duct connected with the heating system, wherein the heating system is provided at the blade root, and the heating system comprises a blower module, a heating module, a power supply control module and a wireless control module, wherein the heating module is connected with the blower module, the heating system is located at the blade root, the power supply control module and the wireless control module are disposed at the side of the heating module, and the ventilation duct is installed on the anti-shearing web plate.

Further, four temperature control points are located inside the blade, wherein each temperature control point is provided with a temperature sensor, and the four temperature control points are: air outlet of the heater, the outlet of the ventilation duct, the surface of the interior space of the front edge of the blade which is 15-20 m distant from the blade root, the surface of the interior space of the back edge of the blade which is 5 m distant from the blade root, wherein the four temperature sensors detect the interior temperature of the blade and the four temperature control points all participate in the system control logic.

Further, the system control logic is: when the temperature of the surface of the interior space of the front edge of the blade 15-20 m distant from the blade root is higher than the set temperature, the heating system stops working, and when the temperature of the four temperature control points are all lower than the set temperature, the heating system starts heating.

Further, a human-computer interface in installed in the tower, wherein the human-computer interface is connected with the four temperature sensors of the four temperature control points, and receive four temperature signals from the temperature sensors, and the human-computer interface includes a wireless receiving device, a display device and a PLC controller that are cooperative with the wireless box, wherein the wireless receiving device, the display device, the temperature sensor, the electrical cabinet, the heater are all connected with the PLC controller, and wherein the display device displays the operation data of the heating system and whether breakdown occurs, and the PLC controller controls the operation of the modular gas-heat anti-icing system for high-power wind turbine blades.

Further, the current data of the heating system as well as the temperature data and the control signals collected by the temperature sensor establish signal communication with the human-computer interface in the tower through wireless signals emitted by the wireless box, and the human-computer interface is provided with a operation control system which controls the modular gas-heat anti-icing system for high-power wind turbine blades, and the human-computer interface is input with control parameters in order to realize the automatic operation of the modular gas-heat anti-icing system for high-power wind turbine blades.

Further, the device comprises further a special blower supporting frame which is installed at the interior cavity of the blade root, a heater supporting frame and an electrical cabinet supporting frame, wherein the blower module comprises the wind blower, which is installed on the special blower supporting frame through a bolt, and wherein the heating module comprises the heater, which is installed on the heater supporting frame through a bolt, and wherein the power supply control module comprises the electrical cabinet, which is installed on the electric cabinet supporting frame, and wherein the wireless control module comprises the wireless box, which is installed on the heater supporting frame, and wherein the wind blower is connected with the heater through a trapezoidal ventilation connecting duct, wherein the heater is connected with the ventilation duct through the trapezoidal ventilation connecting duct and the connection duct, and the wind reflector is located at the periphery of the ventilation duct which is 100 mm distant from the end of the ventilation duct.

The current invention provides a modular gas-heat anti-icing system and method for wind turbine blades which uses heated air to circulate inside the blades and focally heats the front edge of the blade. The current invention solves the icing problem of the front edge of the idle blades as well as newly formed blades during their operation. It has the function of preventing icing and ice removal. The heating system is easy to be dismounted and to be maintained. Especially, this heating system can be used in idle wind wheels. The heated air forms "a "blade root to blade tip to blade root" closed loop, which improves the heat usage efficiency. The more concrete advantages of the present invention are: using the anti-icing system and method of the present invention, the blades have anti-icing and icing-removal function, which can improve the electricity generation efficiency of the wind wheel in winter. The load of the machine as well as its operation risk has been reduced. The blade is provided with a modular gas-heat anti-icing system, which can be used when the wind wheel is idle, which fills a gap in the state of the art. The usage of human machine interface can also realize the automatic operation of the system.

In the figures: 1 human machine interface; 2 engine room control cabinet; 3 electric cable; 4 slip ring; 5 heating system; 6 blade; 7 blade root baffle; 8 wind blower; 9 blower supporting frame; 10 trapezoidal ventilation connecting duct; 11 heater; 12 electric box; 13 electric box supporter; 14 heater supporter; 15 trapezoidal ventilation duct; 16 connection duct; 17 wireless box; 18 anti-shearing web plate; 19 ventilation duct; 20 snap joint specialized for the ventilation duct; 21 wind deflector; 22 upper snap joint specialized for the duct; 23 lower snap joint specialized for the duct.

EMBODIMENT

The current invention is further illustrated by the following figures and embodiments.

As shown in FIG. 1 to FIG. 7, a modular gas-heat anti-icing method for high-power wind turbine blades, comprising blades 6 consisted of glass fiber composite, tower, an anti-shearing web plate 18 which is located inside the blade and which divides the interior of the blade into front and back edges, a dismountable heating system 5 fixed at the root of the blade, a ventilation duct 19 which is connected with the heating system and conducts the heated air into the front edge of the interior of the blade, wind deflector 21, a human machine interface 1 installed inside the tower, a sensor which is connected with the human machine interface, as well as a wind blower supporting frame 9, heater supporting frame 14 and electric cabinet supporting frame 13 which are installed inside the interior cavity of the blade root. The heating system is located at the root of the blade, and the ventilation duct is located on the anti-shearing web plate. The ventilation duct extends from the root of the blade 10 to 20 m toward the blade tip. The wind reflector is located at the periphery of the ventilation duct which is 100 mm distant from the end of the ventilation duct, and the wind deflector divides the front edge of the blade into two parts. The modular gas-heat anti-icing system for high-power wind turbine blades further includes an engine room control cabinet 2, an electric cable 3, a slip ring 4, and a blade root baffle 7.

Figure 2:
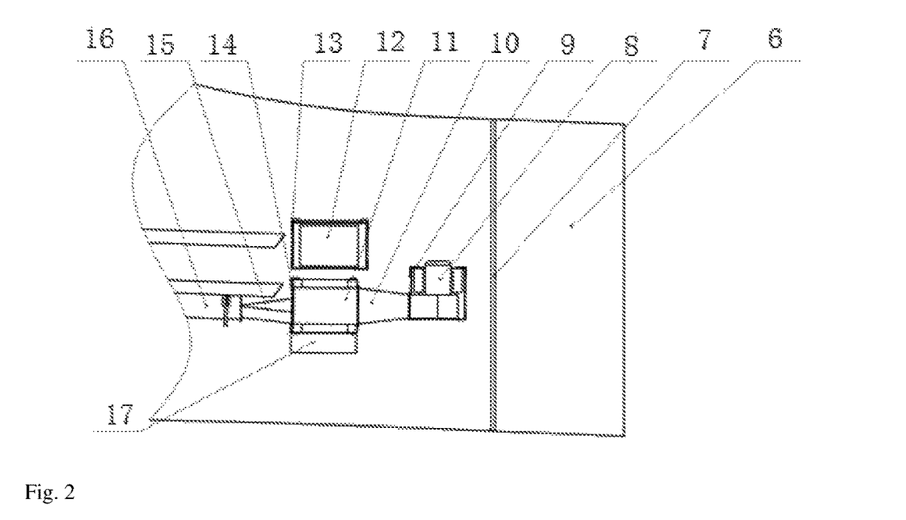
FIG. 2 shows the structure of the heating system of the present invention.

The heating system includes the wind blower 8, the heater 11 which is connected with the wind blower, an electric cabinet 12, a wireless box 17, wherein the electric cabinet and the wireless box are disposed beside the heater, the blower is installed on the special blower supporting frame through a bolt, the heater is installed on the heater supporting frame through a bolt, the electrical cabinet is installed on the electric cabinet supporting frame, and the wireless box is installed on the heater supporting frame. The wind blower is connected with the heater through a trapezoidal ventilation connecting duct 10, wherein the air outlet of the heater is connected with the ventilation duct through the trapezoidal ventilation duct 15 and the ripple connection duct 16.

Figure 3:
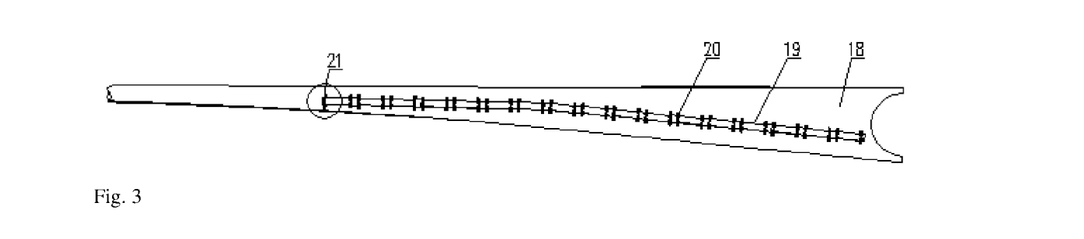
FIG. 3 shows the fixing way of the ventilation duct in the blade of the present invention.
Figure 5:
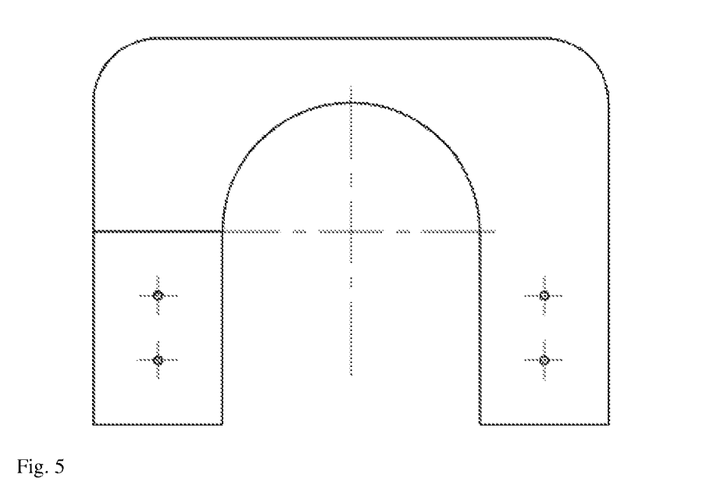
FIG. 5 shows the upper snap joint specialized for the duct of the present invention.
Figure 6:
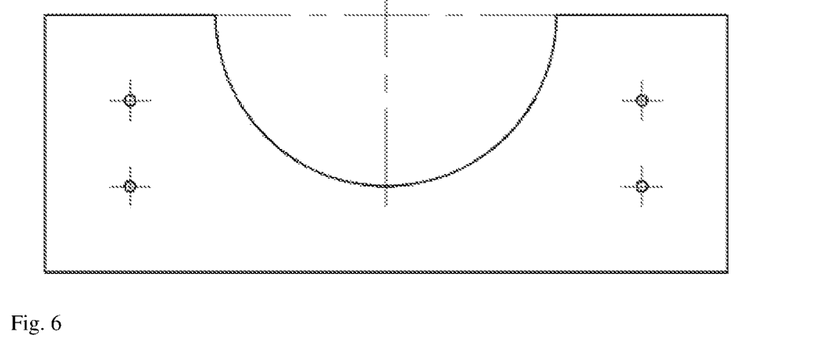
FIG. 6 shows the lower snap joint specialized for the duct of the present invention.

The ventilation duct is fixed on the anti-shearing web plate close to the front edge through the snap joint specialized for the ventilation duct 20, wherein the snap joint specialized for the ventilation duct includes an upper snap joint specialized for the duct and a lower snap joint specialized for the duct. The upper snap joint and the lower snap joint cooperate with each other and clamps the ventilation duct 19. The upper and the lower snap joints are fixed together through four rivets. The specialized snap joints are provided to be 1 m distant from one another and are fixed with the ventilation duct by hand lay-up process. The snap joints 20 are then fixed onto the anti-shearing web plate 18 through hand lay-up process.

The above system includes a blower module, a heating module, a power supply control module and a wireless control module. The size of all of the modules is strictly controlled. The use of the bolt connection facilitates easy installation and de-installation as well as easy maintenance, and can enter the blade through machine and the hub. At the root of the blade, there are provided the corresponding supporting frames of the modules, particularly, the blower 8, hearer 14, electric cabinet 12 as well as wireless box 17 are fixed onto the corresponding supporting frames through bolts. The supporting frames are fixed in the interior cavity of the blade root through pre-embedment (for newly produced blades) or hand lay-up process (for idle blades).

Figure 4:
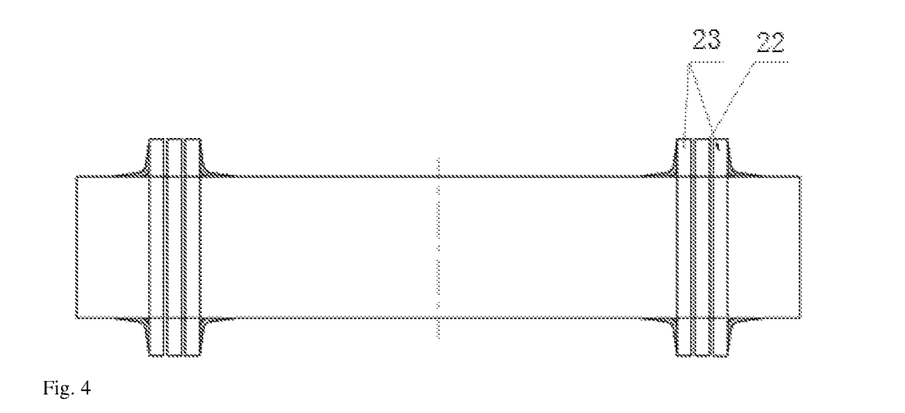
FIG. 4 shows the partial distribution of the ventilation duct of the present invention.
Figure 7:
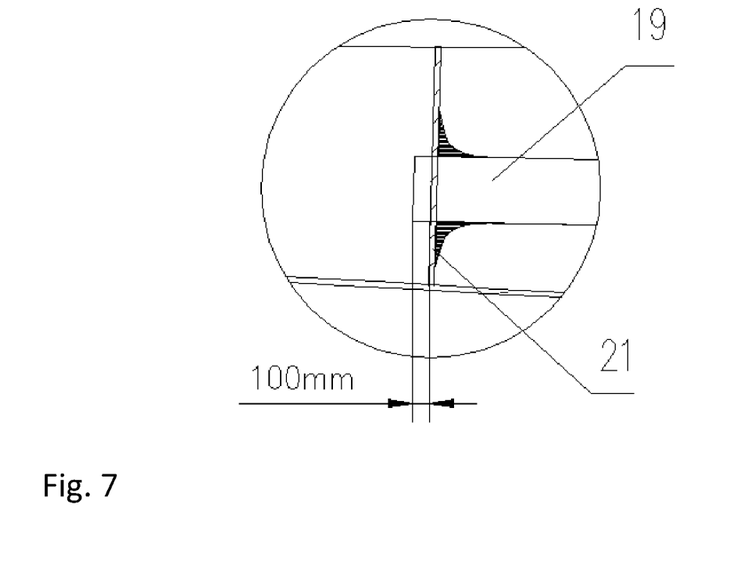
FIG. 7 shows the wind deflector being 100 mm from the end of the ventilation duct.

In order to focally heat the front edge of the blade, the anti-shearing web plate at the front edge is provided with a ventilation duct for transmitting heated air. The ventilation duct extends to 15-20 m distant from the blade root. A wind deflector is provided at the end of the ventilation duct, which divides the front edge of the blade into two parts, so that the hot air in the ventilation duct is only to be conducted to the blade tip and then circulates into the blade root via the back edge of the blade, enabling the hot air to circulate inside the blade and form a "blade root to blade tip to blade root" closed loop, in order to increase the heat usage efficiency.

In order to control the heating system and to prevent the heating system from burning due to overheat, the blade is provided with at least four temperature sensors, four temperature control points are located inside the blade, wherein each temperature control point is provided with a temperature sensor, and the four temperature control points are: air outlet of the heater, the outlet of the ventilation duct, the surface of the interior space of the front edge of the blade which is 15-20 m distant from the blade root, and the surface of the interior space of the back edge of the blade which is 5 m distant from the blade root, wherein the four temperature sensors detect the interior temperature of the blade and the four temperature control points all participate in the system control logic. The system control logic is: when the temperature of the surface of the interior space of the front edge of the blade 15-20 m distant from the blade root is higher than the set temperature, the heating system stops working, and when the temperature of the four temperature control points are all lower than the set temperature, the heating system starts heating. In this way, the blade material can be protected more efficiently. No fire can be caused and the heating function is not compromised.

In order to supervise the heating system more easily, a human-machine interface is installed. The display device displays the operation data of the heating system and whether breakdown occurs, and is controlled by the PLC controller.

Figure 1:
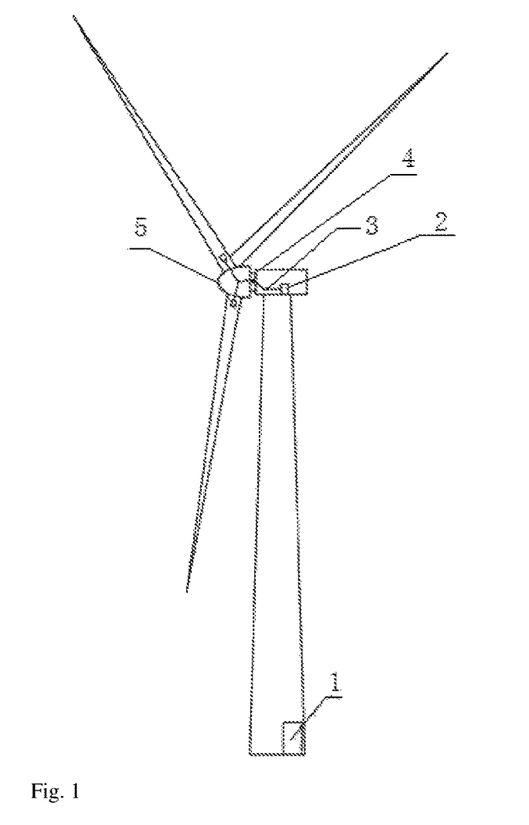
FIG. 1 shows the position of the human machine interface as well as the heating system of the present invention.

The human-machine interface is installed inside the tower to show the operation data and to operate the control system. The control parameters are entered into the human machine interface, in order to realize automatic operation. In order to establish signal communication with the human-computer interface, the current data of the heating system as well as the temperature data and the control signals collected by the temperature sensor in the tower through wireless signals are emitted by the wireless box, in order to establish signal communication with the human-machine interface in the tower.

The wind turbine blade anti-icing device for carrying out the modular gas-heat anti-icing method for high-power wind turbine blades comprises further a special blower supporting frame which is installed at the interior cavity of the blade root, a heater supporting frame and an electrical cabinet supporting frame, wherein the blower module comprises the wind blower, which is installed on the special blower supporting frame through a bolt, and wherein the heating module comprises the heater, which is installed on the heater supporting frame through a bolt, and wherein the power supply control module comprises the electrical cabinet, which is installed on the electric cabinet supporting frame, and wherein the wireless control module comprises the wireless box, which is installed on the heater supporting frame, and wherein the wind blower is connected with the heater through a trapezoidal ventilation connecting duct, wherein the heater is connected with the ventilation duct through the trapezoidal ventilation connecting duct and the connection duct, and the wind reflector is located at the periphery of the ventilation duct which is 100 mm distant from the end of the ventilation duct.

The current invention is related with a modular gas-heat anti-icing method for high-power wind turbine blades, wherein a modular heating system is provided on the blade root, a ventilation duct is provided inside the blade, a wind deflector is provided at the end of the ventilation duct, which divides the front edge of the blade into two parts, so that the hot air in the ventilation duct is only to be conducted to the blade tip and then circulates into the blade root via the back edge of the blade, enabling the hot air to circulate inside the blade and form a "blade root to blade tip to blade root" closed loop, so that the purpose of heating the front edge of the blade is achieved, and it is ensured that the whole blade does not ice by preventing the front edge of the blade from icing.

Further, the ventilation duct is disposed within the interior space of the front edge of the blade and extends from the blade root 10 to 20 m toward the blade tip, and ensures to extend to the farthest part of the blade tip, so that the hot air in the ventilation duct is only to be conducted to the blade tip and then circulates into the blade root via the back edge of the blade, enabling the hot air to circulate inside the blade and form a "blade root to blade tip to blade root" closed loop.

Further, the modular heating system comprises a detachable heating system and the ventilation duct connected with the heating system, wherein the heating system is provided at the blade root, and the heating system comprises a blower module, a heating module, a power supply control module and a wireless control module, wherein the heating module is connected with the blower module, the heating system is located at the blade root, the power supply control module and the wireless control module are disposed at the side of the heating module, and the ventilation duct is installed on the anti-shearing web plate.

Further, the four temperature control points are located inside the blade, wherein each temperature control point is provided with a temperature sensor, and the four temperature control points are: air outlet of the heater, the outlet of the ventilation duct, the surface of the interior space of the front edge of the blade which is 15-20 m distant from the blade root, the surface of the interior space of the back edge of the blade which is 5 m distant from the blade root, wherein the four temperature sensors detect the interior temperature of the blade and the four temperature control points all participate in the system control logic.

Further, the system control logic is: when the temperature of the surface of the interior space of the front edge of the blade 15-20 m distant from the blade root is higher than the set temperature, the heating system stops working, and when the temperature of the four temperature control points are all lower than the set temperature, the heating system starts heating.

Further, a human-computer interface in installed in the tower, wherein the human-computer interface is connected with the four temperature sensors of the four temperature control points, and receive four temperature signals from the temperature sensors, and the human-computer interface includes a wireless receiving device, a display device and a PLC controller that are cooperative with the wireless box, wherein the wireless receiving device, the display device, the temperature sensor, the electrical cabinet, the heater are all connected with the PLC controller, and wherein the display device displays the operation data of the heating system and whether breakdown occurs, and the PLC controller controls the operation of the modular gas-heat anti-icing system for high-power wind turbine blades.

Further, the current data of the heating system as well as the temperature data and the control signals collected by the temperature sensor establish signal communication with the human-computer interface in the tower through wireless signals emitted by the wireless box, and the human-computer interface is provided with a operation control system which controls the modular gas-heat anti-icing system for high-power wind turbine blades, and the human-computer interface is input with control parameters in order to realize the automatic operation of the modular gas-heat anti-icing system for high-power wind turbine blades.

The installation of the wind turbine blade anti-icing device for carrying out the modular gas-heat anti-icing method for high-power wind turbine blades includes the following steps:

A. Preparing materials, including the necessary components;

B. Installing the ventilation duct: using the snap joints specialized for the ventilation duct to fix the ventilation duct onto the anti-shearing web plate in the interior cavity of blade, wherein the snap joint specialized for the ventilation duct includes an upper snap joint specialized for the duct and a lower snap joint specialized for the duct. The upper snap joint and the lower snap joint cooperate with each other and clamps the ventilation duct 19. The upper and the lower snap joints are fixed together through four rivets. The specialized snap joints are provided to be 1 m distant from one another and are fixed with the ventilation duct by hand lay-up process. The snap joints are then fixed onto the anti-shearing web plate through hand lay-up process.

C. Installing the wind deflector: installing the wind deflector at the periphery of the ventilation duct which is 100 mm distant from the end of the ventilation duct, wherein the wind deflector divides the blade front edge into two parts.

D. Installing the temperature sensors: the four temperature sensors are installed at the following four positions: air outlet of the heater, the outlet of the ventilation duct, the surface of the interior space of the front edge of the blade which is 15-20 m distant from the blade root, the surface of the interior space of the back edge of the blade which is 5 m distant from the blade root, and connecting the signal wires of the temperature sensors with the temperature sensors.

E. Installing a heating system composing the following steps:

a) installing the supporting frames: the supporting frames include the blower supporting frame, the heater supporting frame and the electric cabinet supporting frame. The installation way is: for newly produced blades, the blower supporting frame, the heater supporting frame and the electric cabinet supporting frame are fixed in the interior cavity of the blade root through pre-embedment. For idle blades, the blower supporting frame, the heater supporting frame and the electric cabinet supporting frame are fixed inside the interior cavity of the root of the blade via hand lay-up process.

b) Installing the heater: the heater is installed onto the heater supporting frame through the bolts, and the air outlet of the heater is connected with the ventilation duct through the ripple connection duct.

c) Installing the wind blower: the wind blower is installed on the blower supporting frame through the bolt, and the wind blower is connected with the heater through a trapezoidal ventilation connecting duct.

d) Installing the electric cabinet, wherein the electric cabinet is installed onto the supporting frame through bolts, and the corresponding cables are connected.

e) Installing the wireless box: installing the wireless box beside the heater which is fixed on the supporting frame of the heater.

F. Installing the human-machine interface: installing the human-machine interface on the interior floor of the tower, including the wireless receiving device, the display device, and the PLC controller. The temperature signal wires and other cables are connected. The temperature sensor, the electrical cabinet, the heater, the wireless receiving device, the display and the PLC controller are all connected.

G. Debugging and finishing installation: finishing installing other components and carrying out primary debugging, and finishing the installation of the wind turbine blade anti-icing device for carrying out the modular gas-heat anti-icing method for high-power wind turbine blades.

The ventilation duct is fixed on the anti-shearing web plate close to the front edge using snap joints specialized for the duct of the present invention, wherein the snap joints specialized for the duct include the upper and the lower snap joints specialized for the duct.

The current invention provides a wind turbine blade anti-icing device for carrying out the modular gas-heat anti-icing method for high-power wind turbine blades. The blades have anti-icing and ice-removal capability. The wind blower and heater are used to provide heated wind, and the heated air is conducted to 15-20 distant from the front edge of the blade by the duct, to focally heat the front edge of the blade, and forms a "blade root to blade tip to blade root" closed loop which increases the efficiency of the heat usage. The heating system fixed at the blade root is distributed in modules, wherein the size of each module is strictly controlled. The bolt connection is easy to de-install and maintain, and can enter the blade through the machine and hub. It enables improvement of existing blades.

The invention claimed is:

1. A modular gas-heat anti-icing method for high-power wind turbine blades, characterized in that a modular heating system is provided on a blade root of a blade, an anti-shearing web plate is located inside the blade and divides an interior of the blade into a front edge and a back edge, a ventilation duct is provided inside the blade, a wind deflector is provided at an end of the ventilation duct, wherein the wind deflector divides the front edge of the blade into two parts, so that hot air in the ventilation duct is only to be conducted to a blade tip and then circulates into the blade root via the back edge of the blade, enabling the hot air to circulate inside the blade and form a "blade root to blade tip to blade root" closed loop, so that the purpose of heating the front edge of the blade is achieved, and it is ensured that the whole blade does not ice by preventing the front edge of the blade from icing, wherein the wind deflector is substantially orthogonal to the ventilation duct and the anti-shearing web plate, and four temperature control points are located inside the blade, wherein each temperature control point is provided with a temperature sensor, and the four temperature control points are: an air outlet of a heater, an outlet of the ventilation duct, a surface of an interior space of the front edge of the blade which is 15-20 m distant from the blade root, and a surface of an interior space of the back edge of the blade which is 5 m distant from the blade root, wherein the four temperature sensors detect an interior temperature of the blade and the four temperature control points all participate in a system control logic.

2. The modular gas-heat anti-icing method for high-power wind turbine blades according to claim 1, characterized in that the ventilation duct is disposed within an interior space of the front edge of the blade and extends from the blade root 10 to 20 m toward the blade tip, and ensures to extend to a farthest part of the blade tip, so that the hot air in the ventilation duct is only to be conducted to the blade tip and then circulates into the blade root via the back edge of the blade, enabling the hot air to circulate inside the blade and form the "blade root to blade tip to blade root" closed loop.

3. The modular gas-heat anti-icing method for high-power wind turbine blades according to claim 2, characterized in that the modular heating system comprises a detachable heating system and the ventilation duct connected with the heating system, wherein the heating system is provided at the blade root, and the heating system comprises a blower module, a heating module, a power supply control module and a wireless control module, wherein the heating module is connected with the blower module, the heating system is located at the blade root, the power supply control module and the wireless control module are disposed at a side of the heating module, and the ventilation duct is installed on the anti-shearing web plate.

4. The modular gas-heat anti-icing method for high-power wind turbine blades according to claim 1, characterized in that the system control logic is: when a temperature of the surface of the interior space of the front edge of the blade 15-20 m distant from the blade root is higher than a set temperature, the heating system stops working, and when a temperature of the four temperature control points are all lower than the set temperature, the heating system starts heating.

5. The modular gas-heat anti-icing method for high-power wind turbine blades according to claim 1, characterized in that a human-computer interface is installed in a tower, wherein the human-computer interface is connected with four temperature sensors of four temperature control points, and receives four temperature signals from the temperature sensors, and the human-computer interface includes a wireless receiving device, a display device and a PLC controller that are cooperative with a wireless box, wherein the wireless receiving device, the display device, the temperature sensors, an electrical cabinet, and a heater are all connected with the PLC controller, and wherein the display device displays operation data of the heating system and whether breakdown occurs, and the PLC controller controls an operation of the modular gas-heat anti-icing system for high-power wind turbine blades.

6. The modular gas-heat anti-icing method for high-power wind turbine blades according to claim 5, characterized in that current data of the heating system as well as temperature data and control signals collected by the temperature sensors establish signal communication with the human-computer interface in the tower through wireless signals emitted by the wireless box, and the human-computer interface is provided with an operation control system which controls the modular gas-heat anti-icing system for high-power wind turbine blades, and the human-computer interface is input with control parameters in order to realize automatic operation of the modular gas-heat anti-icing system for high-power wind turbine blades.

7. A wind turbine blade anti-icing device for carrying out the modular gas-heat anti-icing method for high-power wind turbine blades according to claim 1, comprising wind turbine blades, anti-shearing web plates in the blades which divide the interior of the blades into a front edge and a back edge, a dismountable heating system, a ventilation duct that is connected with the heating system, and the wind turbine blades are installed on a tower, characterized in that the heating system comprises a blower module, a heating module which is connected with the blower module, a power supply control module and a wireless control module, wherein the heating system is located at the blade root and is a modular heating system, a ventilation duct is provided inside the blade, a wind deflector is provided at the end of the ventilation duct, wherein the wind deflector divides the front edge of the blade into two parts, so that the hot air in the ventilation duct is only to be conducted to the blade tip and then circulates into the blade root via the back edge of the blade, enabling the hot air to circulate inside the blade and form a "blade root to blade tip to blade root" closed loop, so that the purpose of heating the front edge of the blade is achieved, and it is ensured that the whole blade does not ice by preventing the front edge of the blade from icing, wherein the wind deflector is substantially orthogonal to the ventilation duct, and four temperature control points are located inside the blade, wherein each temperature control point is provided with a temperature sensor, and the four temperature control points are: an air outlet of a heater, an outlet of the ventilation duct, a surface of the interior space of the front edge of the blade which is 15-20 m distant from the blade root, and a surface of an interior space of the back edge of the blade which is 5 m distant from the blade root, wherein the four temperature sensors detect an interior temperature of the blade and the four temperature control points all participate in a system control logic.

8. The wind turbine blade anti-icing device for carrying out the modular gas-heat anti-icing method for high-power wind turbine blades according to claim 7, characterized in that the ventilation duct is disposed within an interior space of the front edge of the blade and extends from the blade root 10 to 20 m toward the blade tip, and ensures to extend to a farthest part of the blade tip, so that the hot air in the ventilation duct is only to be conducted to the blade tip and then circulates into the blade root via the back edge of the blade, enabling the hot air to circulate inside the blade and form the "blade root to blade tip to blade root" closed loop.

9. The wind turbine blade anti-icing device for carrying out the modular gas-heat anti-icing method for high-power wind turbine blades according to claim 8, characterized in that the modular heating system comprises a detachable heating system and the ventilation duct connected with the heating system, wherein the heating system is provided at the blade root, and the heating system comprises a blower module, a heating module, a power supply control module and a wireless control module, wherein the heating module is connected with the blower module, the heating system is located at the blade root, the power supply control module and the wireless control module are disposed at a side of the heating module, and the ventilation duct is installed on the anti-shearing web plate.

10. The wind turbine blade anti-icing device for carrying out the modular gas-heat anti-icing method for high-power wind turbine blades according to claim 7, characterized in that the system control logic is: when a temperature of the surface of the interior space of the front edge of the blade 15-20 m distant from the blade root is higher than a set temperature, the heating system stops working, and when a temperature of the four temperature control points are all lower than the set temperature, the heating system starts heating.

11. The wind turbine blade anti-icing device for carrying out the modular gas-heat anti-icing method for high-power wind turbine blades according to claim 7, characterized in that a human-computer interface is installed in the tower, wherein the human-computer interface is connected with four temperature sensors of four temperature control points, and receives four temperature signals from the temperature sensors, and the human-computer interface includes a wireless receiving device, a display device and a PLC controller that are cooperative with a wireless box, wherein the wireless receiving device, the display device, the temperature sensors, an electrical cabinet, and a heater are all connected with the PLC controller, and wherein the display device displays operation data of the heating system and whether breakdown occurs, and the PLC controller controls an operation of the modular gas-heat anti-icing system for high-power wind turbine blades.

12. The wind turbine blade anti-icing device for carrying out the modular gas-heat anti-icing method for high-power wind turbine blades according to claim 11, characterized in that current data of the heating system as well as temperature data and control signals collected by the temperature sensors establish signal communication with the human-computer interface in the tower through wireless signals emitted by the wireless box, and the human-computer interface is provided with an operation control system which controls the modular gas-heat anti-icing system for high-power wind turbine blades, and the human-computer interface is input with control parameters in order to realize automatic operation of the modular gas-heat anti-icing system for high-power wind turbine blades.

13. The wind turbine blade anti-icing device for carrying out the modular gas-heat anti-icing method for high-power wind turbine blades according to claim 7, characterized in that the wind turbine blade anti-icing device comprises further a special blower supporting frame which is installed at an interior cavity of the blade root, a heater supporting frame and an electrical cabinet supporting frame, wherein the blower module comprises a wind blower, which is installed on the special blower supporting frame through a bolt, and wherein the heating module comprises a heater, which is installed on the heater supporting frame through a bolt, and wherein the power supply control module comprises an electrical cabinet, which is installed on the electric cabinet supporting frame, and wherein the wireless control module comprises a wireless box, which is installed on the heater supporting frame, and wherein the wind blower is connected with the heater through a trapezoidal ventilation connecting duct, wherein the heater is connected with the ventilation duct through the trapezoidal ventilation connecting duct and a connection duct, and the wind deflector is located at a periphery of the ventilation duct which is 100 mm distant from the end of the ventilation duct.

14. A modular gas-heat anti-icing method for high-power wind turbine blades, characterized in that a modular heating system is provided on a blade root, a ventilation duct is provided inside a blade, a wind deflector is provided at an end of the ventilation duct, wherein the wind deflector divides a front edge of the blade into two parts, so that hot air in the ventilation duct is only to be conducted to a blade tip and then circulates into the blade root via a back edge of the blade, enabling the hot air to circulate inside the blade and form a "blade root to blade tip to blade root" closed loop, so that the purpose of heating the front edge of the blade is achieved, and it is ensured that the whole blade does not ice by preventing the front edge of the blade from icing,
wherein the wind deflector is substantially orthogonal to the ventilation duct, and
wherein four temperature control points are located inside the blade, wherein each temperature control point is provided with a temperature sensor, and the four temperature control points are: an air outlet of a heater, an outlet of the ventilation duct, a surface of an interior space of the front edge of the blade which is 15-20 m distant from the blade root, and a surface of an interior space of the back edge of the blade which is 5 m distant from the blade root, wherein the four temperature sensors detect an interior temperature of the blade and the four temperature control points all participate in a system control logic,
wherein the system control logic is: when a temperature of the surface of the interior space of the front edge of the blade 15-20 m distant from the blade root is higher than a set temperature, the heating system stops working, and when a temperature of the four temperature control points are all lower than the set temperature, the heating system starts heating.

15. The modular gas-heat anti-icing method for high-power wind turbine blades according to claim 14, wherein the air outlet of the ventilation duct is connected with the ventilation duct through a trapezoidal ventilation duct and a ripple connection duct.

\* \* \* \* \*